(12) United States Patent
Asakura et al.

(10) Patent No.: US 7,312,946 B2
(45) Date of Patent: Dec. 25, 2007

(54) METHOD AND APPARATUS FOR SERVO CONTROL IN A DISK DRIVE

(75) Inventors: Makoto Asakura, Tokyo (JP); Masahide Yatsu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/412,144

(22) Filed: Apr. 27, 2006

(65) Prior Publication Data

US 2006/0245105 A1    Nov. 2, 2006

(30) Foreign Application Priority Data

Apr. 27, 2005    (JP) .............................. 2005-129580

(51) Int. Cl.
*G11B 5/596*    (2006.01)

(52) U.S. Cl. .................................................. 360/77.06

(58) Field of Classification Search ..................... None
See application file for complete search history.

(56) References Cited

U.S. PATENT DOCUMENTS

| 5,717,538 A | 2/1998 | Cheung et al. |
| 5,867,341 A | 2/1999 | Volz et al. |
| 6,122,117 A | 9/2000 | Aikawa |
| 6,188,484 B1 * | 2/2001 | Lee et al. ................... 356/499 |
| 6,535,348 B1 | 3/2003 | Kagami et al. |
| 6,738,205 B1 * | 5/2004 | Moran et al. ................. 360/17 |
| 7,199,956 B1 * | 4/2007 | Moser et al. ................. 360/46 |
| 2003/0026016 A1 | 2/2003 | Heydari et al. |

FOREIGN PATENT DOCUMENTS

| EP | 0 942 413 A1 | 9/1999 |
| JP | 04-16872 B2 | 3/1992 |
| JP | 06-231552 | 8/1994 |
| JP | 2000-306348 | 11/2000 |

OTHER PUBLICATIONS

Australian Search Report dated Feb. 7, 2007 for Singapore App. No. 200601944-2.

* cited by examiner

*Primary Examiner*—K. Wong
(74) *Attorney, Agent, or Firm*—Pillsbury Winthrop Shaw Pittman, LLP

(57) ABSTRACT

According to one embodiment, in a disk drive which performs positioning control of a head on the basis of a servo burst pattern recorded on a disk medium, a servo processor generates a tangent-equivalent value by using a burst value obtained from the servo burst pattern. Furthermore, the servo processor executes an arctangent transform process by an inverse function approximate expression structured on the basis of a relationship between an off-track position and the tangent-equivalent value to detect the off-track position.

7 Claims, 8 Drawing Sheets

METHOD AND APPARATUS FOR SERVO CONTROL IN A DISK DRIVE

CROSS-REFERENCE TO RELATED APPLICATIONS

This application is based upon and claims the benefit of priority from Japanese Patent Application No. 2005-129580, filed Apr. 27, 2005, the entire contents of which are incorporated herein by reference.

BACKGROUND

1. Field

One embodiment of the present invention generally relates to a disk drive including a servo control system and, more particularly, to a servo control system obtained by improving an off-track position detecting method.

2. Description of the Related Art

In a conventional disk drive typified by a hard disk drive, a servo control system which controls a head to position the head at a target track (target cylinder) position by using servo information recorded on a disk medium is incorporated.

The servo control system uses servo information read by a read head to calculate a track address to identify a target track and an off-track position (PES) which is a positional error from a track center of the target track. The servo control system uses a servo burst pattern included in servo information to calculate an off-track position.

In this case, as a scheme which detects an off-track position of a read head, in addition to a burst detecting scheme which uses a servo burst pattern, a phase difference detecting scheme is known (for example, see Jpn. Pat. Appln. KOKAI Publication No. 6-231552).

In this phase difference detecting scheme, schematically, a discrete Fourier transform (DFT) process is performed to a servo reproduction signal read by a read head and reproduced by a signal processing circuit (read channel) to generate a sine component value and a cosine component value. Furthermore, the ratio (tangent) of the sine to the cosine is subjected to arctangent transform to detect an off-track position corresponding to a phase difference from the track center.

In a conventional phase difference detecting scheme, a servo pattern different from a servo burst pattern of the burst detecting scheme is generally used. On the other hand, of burst values A, B, C, and D obtained from the servo burst pattern, a servo operation "A-B" is regarded as an almost sinusoidal component value, and servo operation "C-D" is regarded as an almost cosinusoidal component value, so that an almost correct off-track position can be detected by an arctangent transform process performed by an inverse function approximate expression. More specifically, the phase difference detecting scheme using a servo burst pattern can be applied.

However, in an actual disk drive, since off-track characteristics based on a burst pattern include a high-order distortion (or an asymmetrical distortion) or an even function, an error over a tolerance probably occurs between an off-track position calculated by an arctangent transform process using a simple inverse function approximate expression and a genuine off-track position. Such deterioration in detection accuracy of an off-track position (positional error of a head with respect to a target position) causes deterioration in servo performance of a disk drive.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is to provide a disk drive having a servo control function to which a phase difference detecting scheme using a servo burst pattern is applied to make it possible to detect a genuine off-track position at high accuracy.

Figure 1:
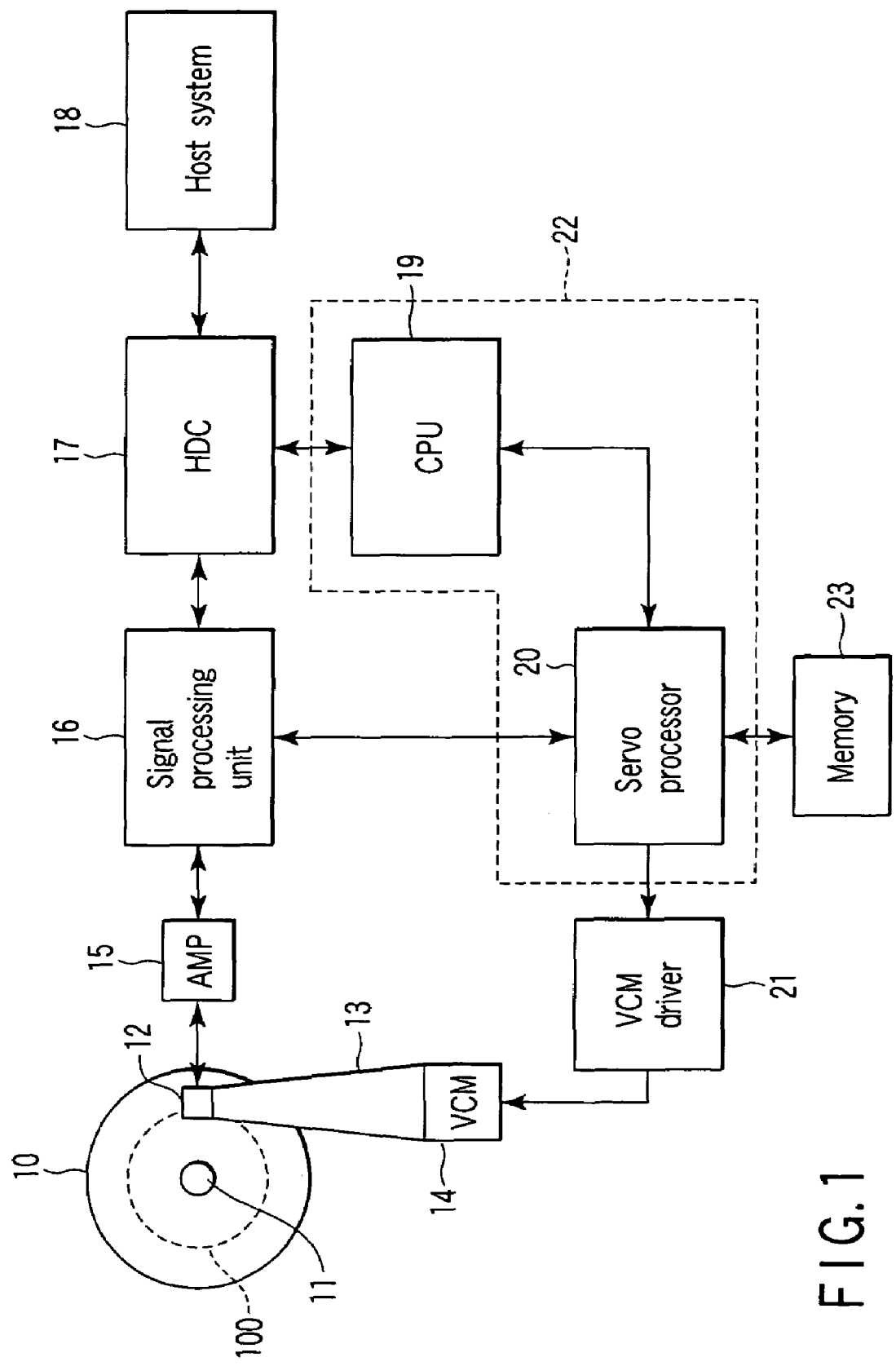
FIG. 1 is a block diagram showing a main part of a disk drive according to an embodiment of the present invention.
Figure 2:
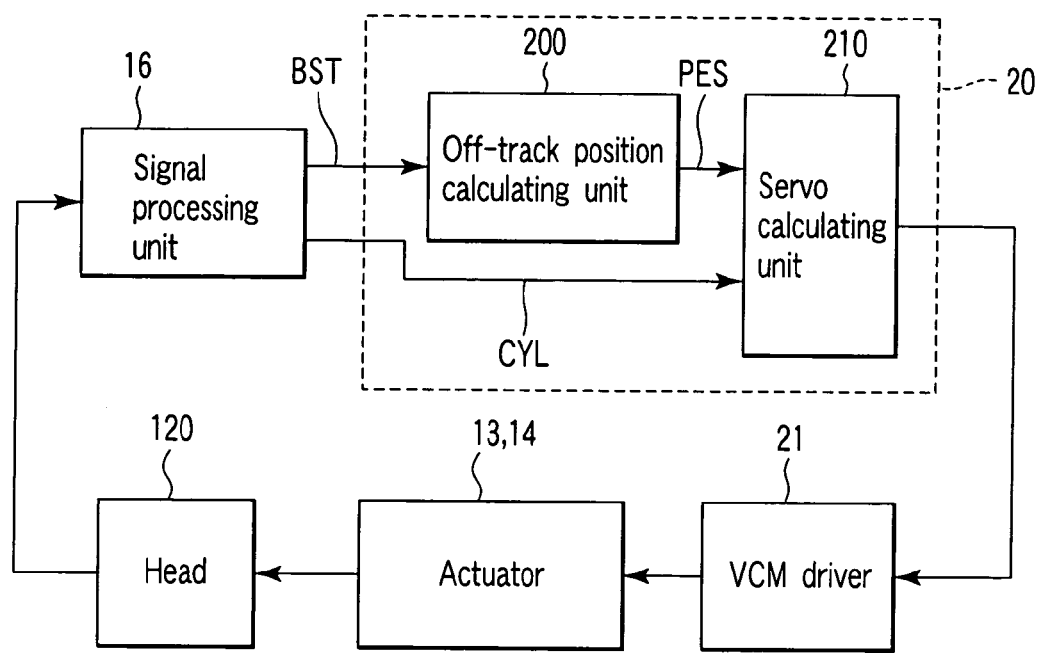
FIG. 2 is a block diagram for explaining a configuration of a servo processor according to the embodiment.
Figure 3:
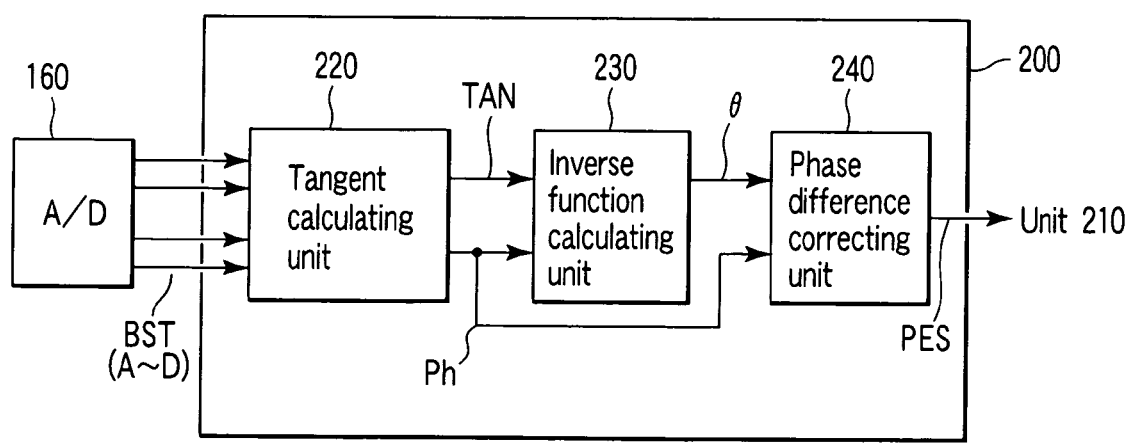
FIG. 3 is a block diagram for explaining a configuration of an off-track position calculating unit according to the embodiment.

According to an embodiment, FIG. 1 is a block diagram showing a main part of a hard disk drive (to be simply referred to as a disk drive hereinafter) according to the embodiment. FIG. 2 is a block diagram for explaining a configuration of a servo processor according to the embodiment. FIG. 3 is a block diagram for explaining a configuration of an off-track position calculating unit included in the servo processor according to the embodiment.

(Configuration of Disk Drive)

The disk drive, as shown in FIG. 1, has a disk medium 10 on which data is magnetically recorded, a spindle motor 11 which rotates the disk medium 10, and an actuator 13 on which a head 12 is mounted.

A large number of tracks (cylinders) 100 serving as data recording areas are formed on the disk medium 10. Each of the tracks 100, as will be described later, includes servo sectors on which servo information including servo burst patterns is recorded.

The head 12 has a read head (120) to read data (including servo information) from the disk medium 10 and a write head to write data on the disk medium 10. The actuator 13 moves the head 12 mounted at the distal end thereof in the radial direction on the disk medium 10 by driving a voice coil motor (VCM) 14.

Furthermore, the disk drive has a preamplifier 15, a signal processing unit 16, a hard disk controller (HDC) 17, a microprocessor (CPU) 19, a servo processor 20, and a VCM driver 21.

The preamplifier 15 amplifies a read signal read from the read head to transmit the read signal to the signal processing unit 16. In addition, the preamplifier 15 amplifies a write signal output from the signal processing unit 16 to transmit the write signal to the write head. The signal processing unit 16 is a read/write channel which processes a read/write signal and has a function of reproducing servo information from the read signal. In addition, the signal processing unit 16 reproduces user data from the read signal to transmit the user data to the hard disk controller 17.

The hard disk controller 17 constitutes an interface between the drive and a host system 18 to execute data transfer control or the like of the read/write data (user data). The CPU 19 is a main control device of the drive which executes control or the like of a read/write operation.

The disk drive according to the embodiment has, besides the CPU 19, the servo processor 20 to execute a servo control process. Specifically, the servo processor 20 is constituted by a digital signal processor (DSP) and a logic circuit. The servo processor 20 drives and controls the actuator 13 through the VCM driver 21 on the basis of the servo information reproduced by the signal processing unit 16 to execute positioning control of the head 12.

The CPU 19 and the servo processor 20 need not be constituted by independent units. The CPU 19 and the servo processor 20 may be constituted by a microprocessor 22 which executes software for realizing the functions of the CPU 19 and the servo processor 20. More specifically, the servo processor 20 may be software for realizing the servo control process.

(Servo Processor)

Figure 4:
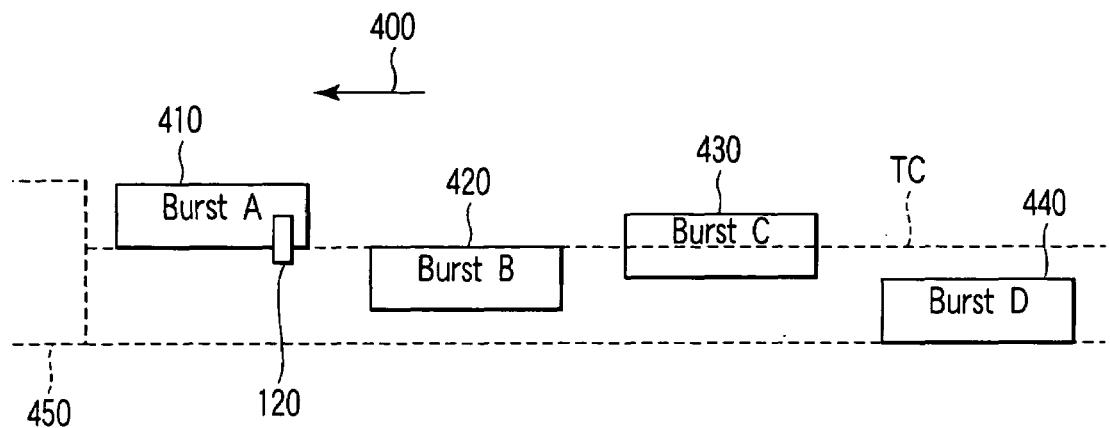
FIG. 4 is a diagram showing an arrangement of servo burst patterns according to the embodiment.

On the disk medium 10, as shown in FIG. 4, servo information including four-phase (A to D) servo burst patterns 410, 420, 430, and 440 and a track address (cylinder address) code 450 are recorded on servo sectors of each track. The track address code 450 is information to identify a track. The servo burst pattern is, as will be described later, information used to detect an off-track position of the read head 120.

In this case, the off-track position is a positional error of a target track identified by the track address code 450 with respect to the center of the tracks when the head 12 is positioned at a target track position. Burst signals obtained by reproducing the servo burst patterns may be represented by BST (A to D) or BST-A to BST-D, respectively. The burst values (amplitude values) may be represented by BstA to BstD, respectively.

The servo processor 20 includes, as shown in FIG. 2, an off-track position calculating unit 200 and a servo calculating unit 210. The off-track position calculating unit 200 uses, as will be described below, a bust signal BST output from the signal processing unit 16 to detect an off-track position of the read head 120 and to output the off-track position data PES to the servo calculating unit 210.

The servo calculating unit 210 calculates a control value to position the head 12 (read head or write head) at a target track position on the basis of a track address CYL and an off-track position PES output from the signal processing unit 16.

The VCM driver 21 supplies a drive current depending on the control value calculated by the servo calculating unit 210 to the VCM 14 of the actuator 13. The actuator 13 is driven and controlled to position the read head 120 at the target track position.

(Off-Track Position Calculating Unit)

The off-track position calculating unit 200 includes, as shown in FIG. 3, a tangent calculating unit 220, an inverse function calculating unit 230, and a phase difference correcting unit 240.

The tangent calculating unit 220 receives burst values BstA, BstB, BstC, and BstD corresponding to the amplitude values of the burst signals BST (A to D) output from an A/D converter 160 included in the signal processing unit 16. The tangent calculating unit 220 uses, as will be described later, the burst values BstA, BstB, BstC, and BstD to calculate a tangent-equivalent value (pseudo tangent) TAN.

The inverse function calculating unit 230 uses an inverse function approximate equation (including a coefficient) structured on the basis of the relationship between the off-track position and the tangent-equivalent value in advance to calculate a phase-equivalent value (phase angle) θ. The coefficient of the inverse function approximate expression is set on the basis of real off-track position characteristics measured for respective phase events (ph) (see FIG. 6). The phase events (ph) are event values obtained by dividing the same address section of a track address by four. Each phase event is information representing a specific section of π/4 of each burst sinusoidal cycle.

In this case, as shown in FIG. 1, the inverse function approximate expression and the coefficient are stored in a memory (flash EEPROM) 23 of the drive. The servo processor 20 extracts the inverse function approximate expression and the coefficient from the memory 23 to cause the inverse function calculating unit 230 to execute an inverse function calculation.

The phase difference correcting unit 240 calculates an off-track position (PES) from the phase-equivalent value θ and the phase event value (ph) to output the off-track position to the servo calculating unit 210. The phase difference correcting unit 240 has the same configuration as that of a phase correcting unit used in a conventional phase detecting scheme.

(Operation)

An operation according to the embodiment will be described below with reference to FIGS. 4 to 14B.

In the disk drive, the head 12 is moved in the radial direction on the disk medium 10 by the actuator 13. At this time, as shown in FIG. 4, the read head 120 reads the servo burst patterns 410, 420, 430, and 440 and the track address code 450 from a track (cylinder) passing immediately under the disk medium 10. In FIG. 4, reference symbol 400 denotes a rotating direction of the disk medium 10.

The signal processing unit 16 reproduces track address information and a burst signal for detecting an off-track quantity at a timing at which the read head 120 passes through the servo sector on the disk medium 10, and transmits the burst signal to the servo processor 20.

In the servo processor 20, as shown in FIG. 2, the off-track position calculating unit 200 converts the burst value of the burst signal BST from the signal processing unit 16 into an off-track position PES. The off-track position PES is a positional error of a target track with respect to the center of the target track as described above.

The servo calculating unit 210 recognizes the off-track position PES and the track address CYL as position information of the read head 120 at the present. The servo calculating unit 210 generates such a control value (VCM drive command) that the present position of the read head 120 is positioned at the target track position.

The VCM driver 21 supplies a drive current depending on the control value calculated by the servo calculating unit 210 to the VCM 14 of the actuator 13, so that the read head 120 is positioned at the target track position by driving and controlling the actuator 13.

In the servo control process described above, an operation of the off-track position calculating unit 200 will be described below.

Figure 5:
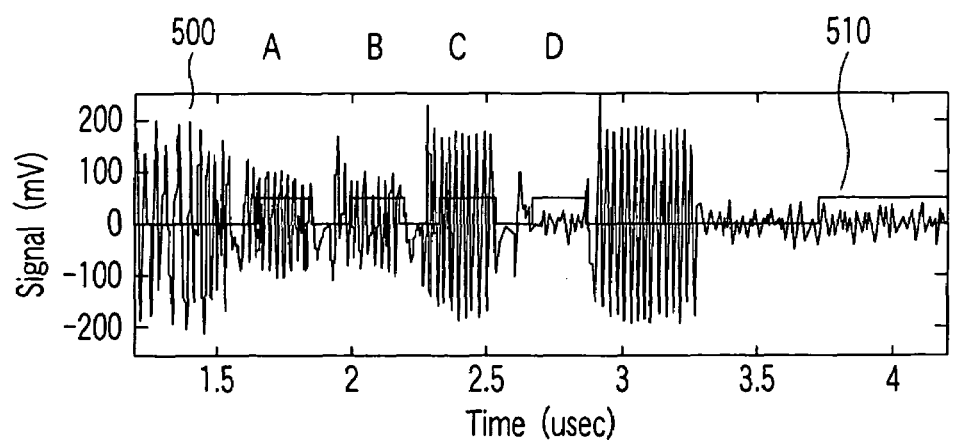
FIG. 5 is a graph showing read signal waveforms of the servo burst patterns according to the embodiment.

FIG. 5 is a graph showing a read signal waveform 500 output from the read head 120 when the read head 120 travels at the centers of the burst patterns A and B as shown in FIG. 4.

Figure 7:
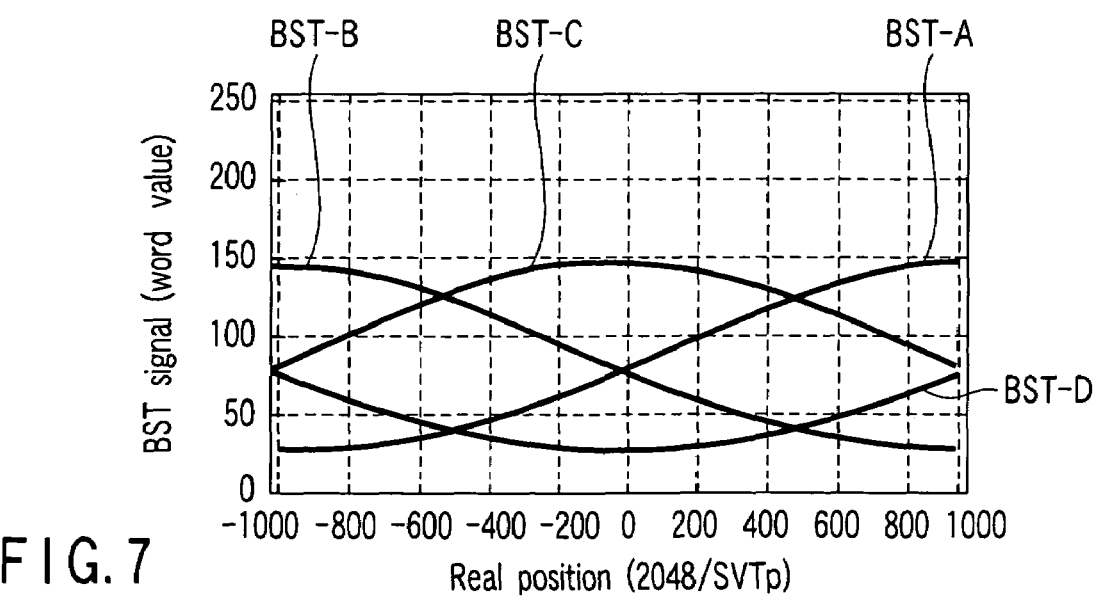
FIG. 7 is a graph showing general burst off-track characteristics according to the embodiment.

The signal processing unit 16 reproduces the burst values BstA, BstB, BstC, and BstD corresponding to reproduced signal amplitude values of four sections (A to D) of a burst gate 510. FIG. 7 is a graph showing changes of the burst values BstA, BstB, BstC, and BstD of the reproduced burst signals BST-A to BST-D with respect to the off-track position in the radial direction (vertical direction in FIG. 4). More specifically, FIG. 7 is a graph showing general burst off-track characteristics (sinusoidal-shaped characteristics) held by four DC offsets having 90° phase differences in the relationships between the off-track position and the burst values. In contrast to this, FIG. 8 is a graph showing burst track characteristics having a large asymmetric diversity in the relationships between the off-track position and the burst values.

Figure 8:
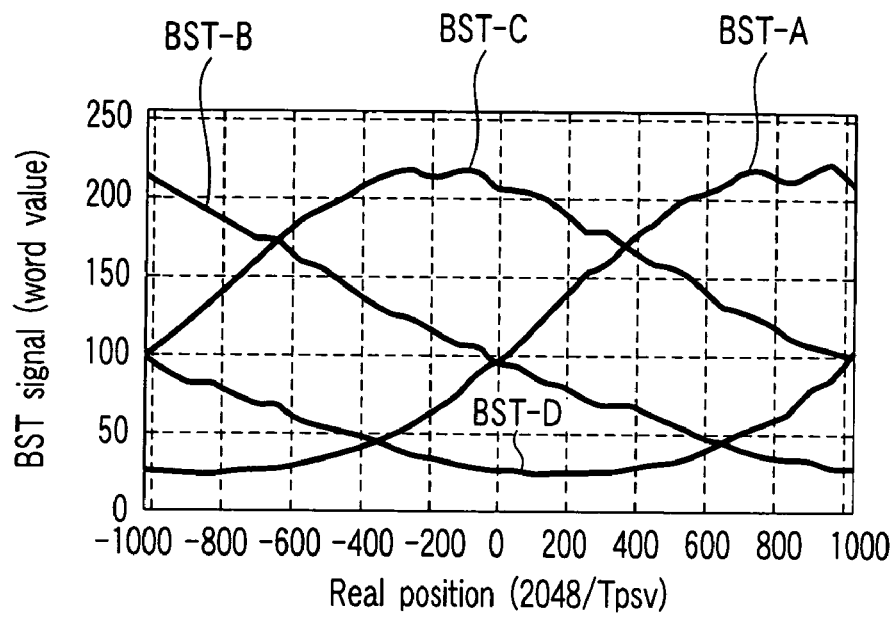
FIG. 8 is a graph showing burst off-track characteristics having a large asymmetric diversity according to the embodiment.

In FIGS. 7 and 8, the abscissa indicates a real off-track position, and the ordinate indicates an amplitude value of the burst signal BST.

In the off-track position calculating unit 200 according to the embodiment, the tangent calculating unit 220 converts the acquired burst value into a pseudo sine component value and a pseudo cosine component value to calculate a tangent-equivalent value (pseudo tangent) TAN which is a value equivalent to the tangents.

As is apparent from FIG. 7, a difference signal between the burst values BstA and BstB exhibits a substantially sinusoidal waveform from which a DC component is removed. In addition, a difference signal between the burst values BstC and BstD exhibits a substantially cosinusoidal waveform with a phase shift of 90°. Therefore, the tangent calculating unit 220 calculates the tangent-equivalent value (pseudo tangent) TAN equivalent to the tangent on the basis of a ratio of the pseudo sine component value to the pseudo cosine component.

More specifically, the tangent calculating unit 220 calculates the tangent-equivalent value TAN from the following equations (1) and (2) by using the four values, i.e., the burst values BstA, BstB, BstC, and BstD. In this case, reference symbol BstAB means "BstA to BstB". Reference symbol BstCD means "BstC to BstD".

$$TAN = -BstAB/BstCD \quad (1)$$

$$TAN = BstCD/BstAB \quad (2)$$

where the equation (1) is established when the phase event value ph is 2 or 3, and the equation (2) is established when the phase event value ph is 1 or 4.

In this case, the following equations (3) to (6) are established for phase event values (ph=1 to 4), respectively.

$$Ph=1 : |BstAB| \geq |BstCD|, BstAB*BstCD \geq 0 \quad (3)$$

$$Ph=2 : |BstAB| < |BstCD|, BstAB*BstCD \geq 0 \quad (4)$$

$$Ph=3 : |BstAB| < |BstCD|, BstAB*BstCD < 0 \quad (5)$$

$$Ph=4 : |BstAB| > |BstCD|, BstAB*BstCD < 0 \quad (6)$$

The phase event values ph are event values obtained by dividing the same track address section by four as described above. Each phase event is a value representing a specific section of $\pi/4$ of each burst sinusoidal cycle.

Figure 10:
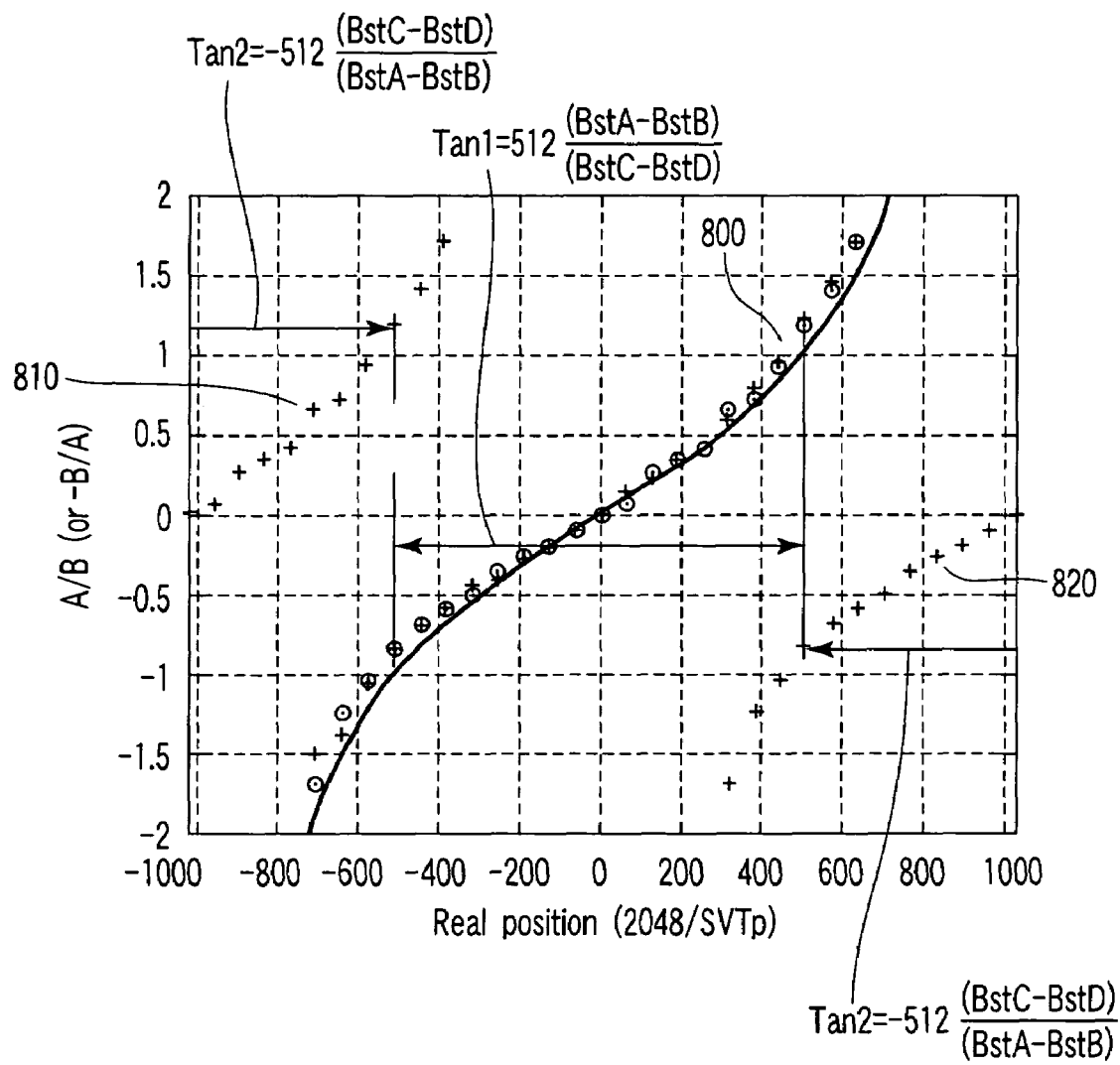
FIG. 10 is a graph showing a relationship between an off-track position and a tangent-equivalent value according to the embodiment.

Since the value "$-BstAB/BstCD$" has an enormous value near the centers of the burst patterns C and D, as the tangent-equivalent value TAN, a tangent-equivalent value subjected to phase correction in each of divided events is calculated. As relationships between the off-track position and the tangent-equivalent values, characteristics 800 (see the equation (1)) and characteristics 810 and 820 (see the equation (2)) as shown in FIG. 10 are obtained. In FIG. 10, the abscissa indicates a real off-track position.

The inverse function calculating unit 230 executes inverse function calculation of the tangent-equivalent value TAN on the basis of the inverse function approximate expression and the coefficient stored in the memory 23 in advance to calculate a phase-equivalent value (phase angle) θ. More specifically, the inverse function calculating unit 230 calculates a cubic function expression shown as the following equation (7).

$$\theta = a_3 * TAN^3 + a_2 * TAN^2 + a_1 * TAN + a_0 \quad (7)$$

The inverse function calculating unit 230 executes a process of switching coefficients depending on the polarity (Ph=1 or 3 and Ph=2 or 4) of the tangent-equivalent value TAN such that the inverse function calculating unit 230 can cope with burst off-track characteristics having a large asymmetrical diversity as shown in FIG. 8. When the symmetry is sufficiently high, the inverse function calculating unit 230 calculates a phase-equivalent value by a single inverse function approximate expression.

The phase difference correcting unit 240 divides the phase-equivalent value θ obtained by inverse function calculation of the inverse function calculating unit 230 depending on events to calculate an off-track position PES. More specifically, the phase difference correcting unit 240 executes calculation expressed by the following equations (8) to (10):

$$PES = Tp/\pi * (\theta - \pi/2), \text{ where } Ph=1 \quad (8)$$

$$PES = Tp/\pi * \theta, \text{ where } Ph=2 \text{ or } 3 \quad (9)$$

$$PES = Tp/\pi * (\theta + \pi/2), \text{ where } Ph=4 \quad (10)$$

In these equations, Tp is a track pitch, i.e., a value equivalent to a track width.

This process occurs since tangent-equivalent values are classified in two types to prevent a calculation error from expanding in the tangent calculating unit 220. As shown in FIG. 10, since there are two off-track positions corresponding to the same phase-equivalent value, the off-track positions serve as indispensable processing elements.

By the off-track position calculating unit 200 according to the embodiment described above, as shown in FIG. 9, an off-track position 710 (characteristics represented by X) where a positional error is suppressed can be detected (estimated) to an ideal position (true value of target position) 700 as shown in FIG. 9. On the other hand, characteristics 720 (expressed by O) are off-track position characteristics obtained by a conventional detecting scheme.

Figure 9:
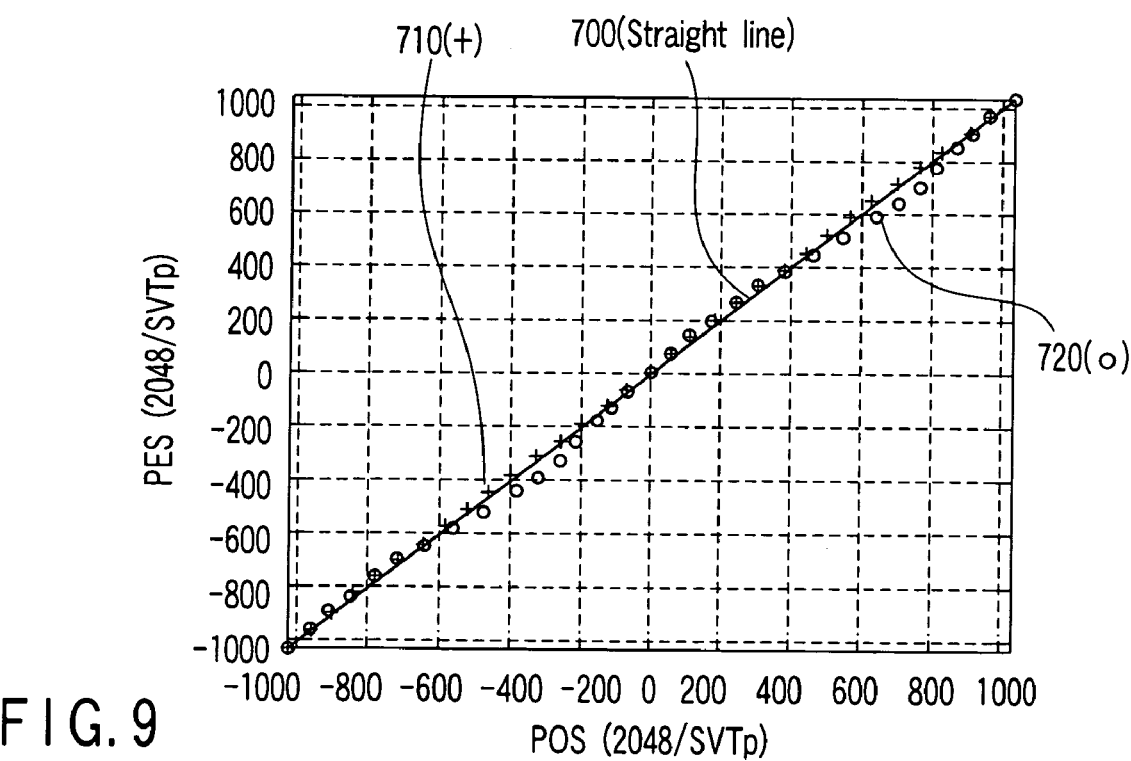
FIG. 9 is a graph showing detection characteristics obtained by the off-track position calculating unit according to the embodiment.

In FIG. 9, the abscissa indicates a real off-track position, and the ordinate indicates an off-track position obtained by calculation (estimation). FIG. 9 shows detection characteristics in burst off-track characteristics having a large asymmetric diversity as shown in FIG. 8. In a conventional detecting scheme, a detection inclination (gain) change associated with a detected positional error causes deterioration in servo performance such as seek time or off-track positioning accuracy. In contrast to this, in the detecting scheme of the embodiment, extremely preferable serve performance can be achieved.

FIGS. 11A to 14B are graphs showing improvement factors of servo control (off-track position detection) performance according to the embodiment. In FIGS. 11A to 14B, FIGS. 11A, 12A, 13A, and 14A are graphs showing 3$\sigma$ positioning accuracy characteristics in off-track positioning. FIGS. 11B, 12B, 13B, and 14B are graphs showing loop transfer gain variable characteristics (corresponding to detection inclination) in off-track positioning. In FIGS. 11A to 14B, the abscissas indicate off-track positions.

Figure 11A:
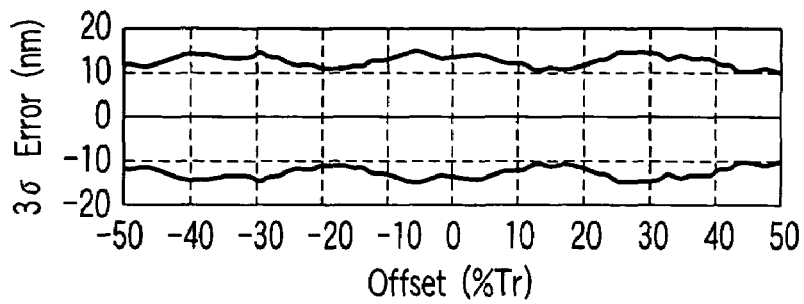
FIGS. 11A and 11B are graphs showing positioning accuracy characteristics and loop transfer gain characteristics obtained by a burst detecting scheme.
Figure 11B:
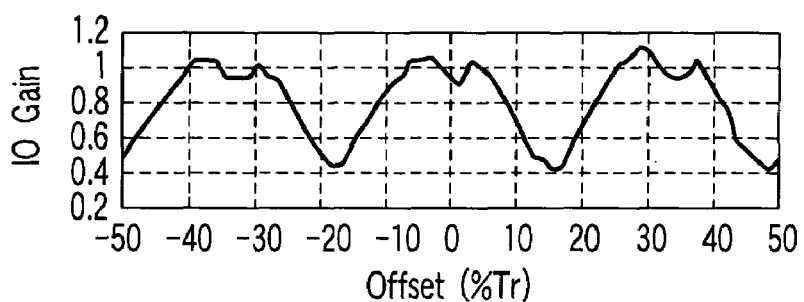
Figure 12A:
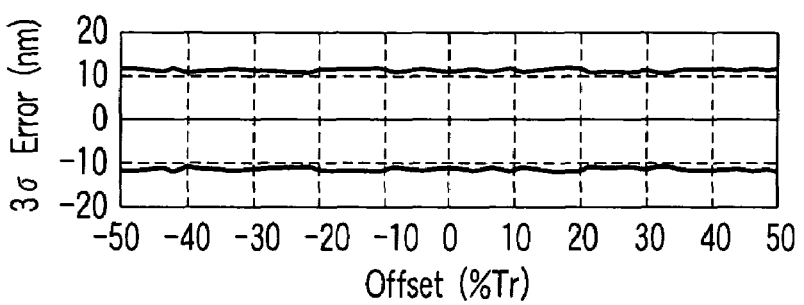
FIGS. 12A and 12B are graphs showing positioning accuracy characteristics and loop transfer gain characteristics obtained by a position detecting scheme according to the embodiment.
Figure 12B:
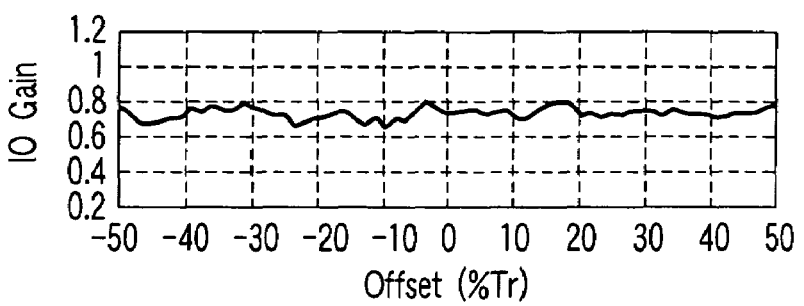

FIGS. 11A and 11B are graphs showing characteristics obtained by a general burst detecting scheme. In contrast to this, FIGS. 12A and 12B are graphs showing characteristics obtained by the position detecting scheme according to the embodiment. As is apparent from these comparisons, in the position detecting scheme according to the embodiment, as shown in FIG. 12B, a loop transfer gain (detection inclination) is kept constant. As shown in FIG. 12A, it is confirmed that the same positioning accuracy can be assured in off-track positioning.

Figure 13A:
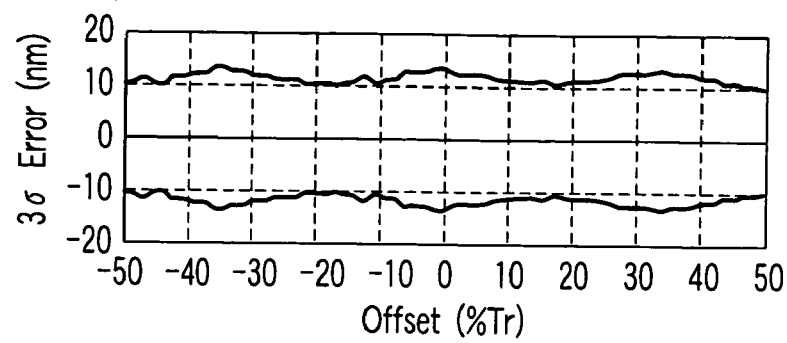
FIGS. 13A and 13B are graphs showing positioning accuracy characteristics and loop transfer gain characteristics obtained before coefficient setting by the position detecting scheme according to the embodiment.
Figure 13B:
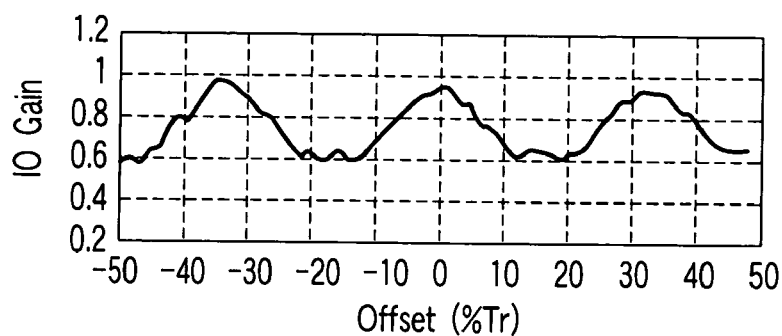
Figure 14A:
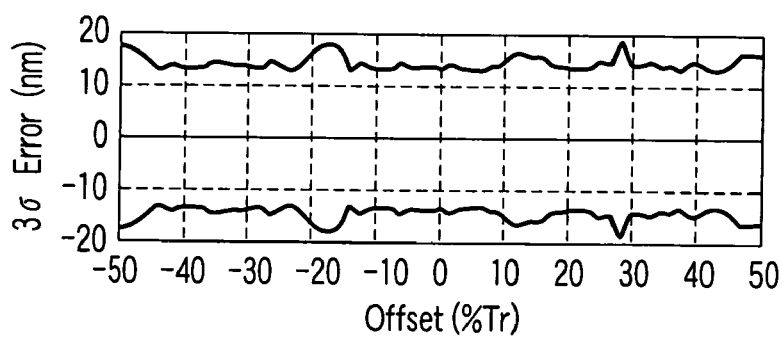
FIGS. 14A and 14B are graphs showing positioning accuracy characteristics and loop transfer gain characteristics obtained after the coefficient setting by the position detecting scheme according to the embodiment.
Figure 14B:
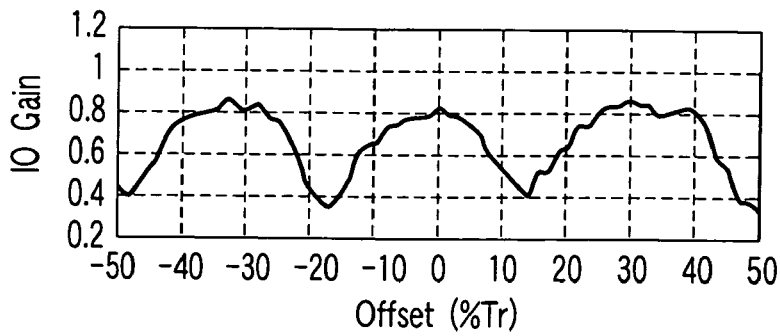

FIGS. 13A and 13B are graphs showing characteristics (phase difference detecting characteristics) obtained before a coefficient is set by the position detecting scheme according to the embodiment. FIGS. 14A and 14B are graphs showing characteristics obtained after a coefficient is set by the position detecting scheme according to the embodiment.

As described above, in short, the position detecting scheme according to the embodiment is an off-track position detecting scheme using an inverse function approximate expression of burst profile characteristics. Furthermore, since position detection is performed by the inverse function approximate expression structured on the basis of the relationship between the off-track position and the tangent-equivalent value in advance, even though the burst off-track characteristics have a asymmetrical distortion, an almost genuine off-track position can be estimated. Therefore, highly accurate head positioning control can be performed, and servo control performance can be improved in a disk drive.

(Coefficient Deriving Method of Inverse Function Approximate Expression)

In the embodiment, as described above, the inverse function calculating unit 230 executes inverse function calculation of the tangent-equivalent value TAN on the basis of the inverse function approximate expression stored in the memory 23 in advance. A coefficient of the inverse function approximate expression is derived on the basis of the relationship between the off-track position and the tangent-equivalent value. The deriving method will be described below mainly with reference to FIGS. 6 and 10.

In approximate expression coefficient derivation, a real positioning position must be estimated with respect to an off-track target value. Even though the off-track target position is set to perform positioning, the position is not a genuine offset position. More specifically, the positioned position is a position derived by an off-track position detection calculating unit, an actual value and a true value are different from each other until calibration setting of the unit is completed.

When the head 12 is positioned in a region near a certain target position, characteristic gains of the actuator 13 and the servo calculating unit 210 are equal to each other and do not vary. However, in fact, when a loop transfer gain of a certain specific frequency in off-track positioning is monitored, for example, as shown in FIG. 11B, it is understood that the loop transfer gain changes. It can be estimated that, from the servo loop configuration in FIG. 2, the change is caused by only a change in gain of the off-track position calculating unit 200. More specifically, when a change in loop transfer change in off-track positioning is monitored, the change consequently corresponds to a change in detection inclination. A method of measuring a loop transfer gain can be achieved by a known method.

As a change in detection inclination of the off-track position calculating unit 200, "dR/dP" is measured at a target position R0 when a detection variation obtained by an actual variation dP is represented by dR. More specifically, when the inverse number "dP/dR" of the detection inclination is integrated by dR, a real positioning position can be estimated with respect to the target position. Since the loop transfer gain includes a gain of a target to be controlled or a controller other than a detecting system, the gain must be removed to calculate an inverse number "dP/dR" of the detection inclination.

In actual position transformation with respect to the target position, any off-track position detecting unit may be theoretically used. However, in fact, when a change of a position detection inclination of the off-track position detection unit decreases, an error in real position estimation tends to be small. Therefore, until advance calibration is performed, as a coefficient of an inverse function calculating unit in the off-track position detecting unit, a coefficient selected to satisfy an approximate expression of an arctangent function is used. FIGS. 13A and 13B show changes in loop transfer gain at approximate functions of the arctangent function in the embodiment. However, when this scheme is compared with the general burst detecting scheme shown in FIGS. 11A and 11B, it is understood that a variation in detection inclination is small. The process using the approximate coefficient of the arctangent function is obtained by realizing a process close to a phase difference detecting process, and can achieve relatively stable detection characteristics. From this point of view, the process is desirable.

The method of estimating a real positioning position (genuine off-track position) with respect to a target position is described above. When the position is calculated, acquired information to the target position can be easily converted into acquired information to a genuine off-track position. The abscissas in FIGS. 7 to 10 are obtained by converting the target position into an estimated actual position by the conversion.

Characteristics 800, 810, and 820 shown in FIG. 10 can be plotted by pseudo tangent calculation in the tangent calculating unit 220 on the basis of the burst values shown in FIGS. 7 and 8. However, in inverse function approximation, a relationship except for a one-to-one relationship is inconvenient. For this reason, a one-to-one relationship is created by performing a process of phase-shifting the characteristics 810 and 820 to overlap the characteristics 810 and 820 on the same event as that of the characteristics 800. A tangent function indicated by the curve in FIG. 10 is not always equal to the actual characteristics 800. In particular, as shown in FIG. 8, in a pattern in which a strong asymmetric distortion is included in the burst characteristics, positions are positioned on the positive side of the tangent function on both the positive-value/negative-value sides. It is understood that positive and negative values should be approximated by different functions.

Figure 6:
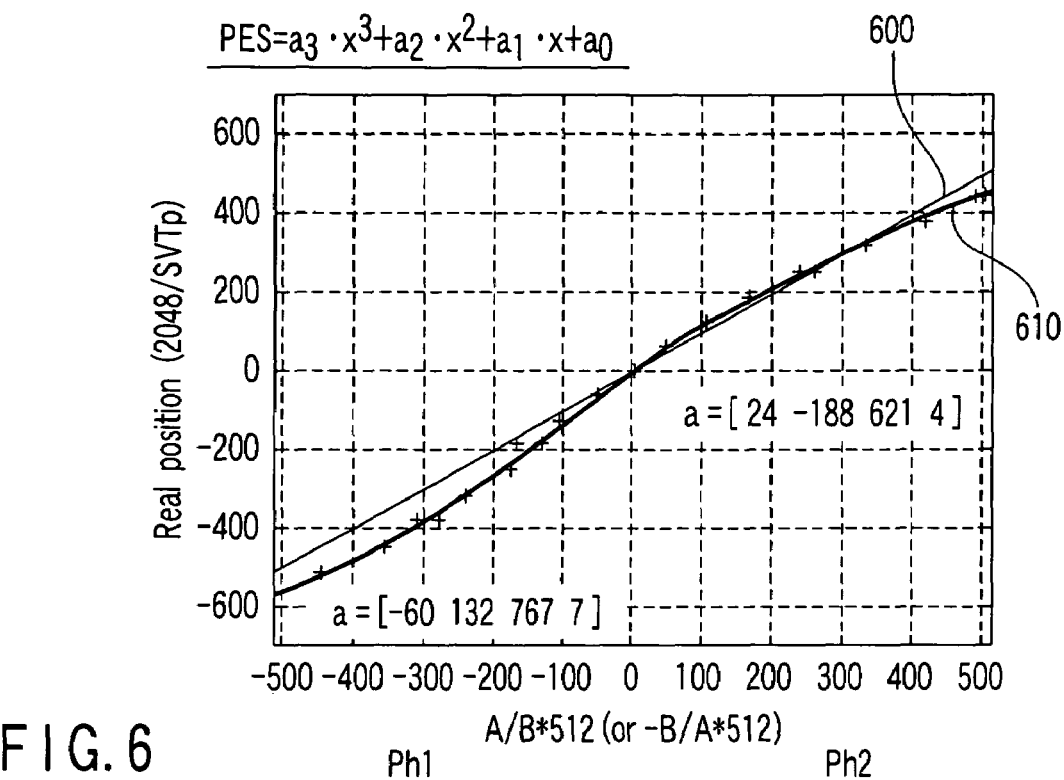
FIG. 6 is a graph for explaining a method of deriving a coefficient of an inverse function approximate expression according to the embodiment.

In FIG. 6, the plots are obtained by overwriting the map while reversing the abscissa and the ordinate to plot values in an inverse function relationship. A characteristic curve 610 is the cubic least squares approximate function. On the characteristic curve 610, the positive and negative values are approximated by different functions. With respect to fitting in least squares approximation, an error decreases when the order increases. However, since error quantity is sufficiently small in cubic approximation, the cubic approximation is preferably performed in consideration of a calculation amount. In the cubic approximate expression shown in FIG. 6, PES means a phase-equivalent value θ, and x means a tangent-equivalent value TAN.

With the above method, the coefficient of the inverse function approximate expression can be derived. In this case, in fact, detection characteristics of the off-track position calculating unit 200 changes depending on radial positions of the disk medium 10. This is caused by a skew angle of the head generated when servo information is recorded. However, also in consideration of an influence of a characteristic change of positions of inner and outer circumferences, a coefficient of an approximate inverse function must be set.

In the embodiment, for example, coefficients of an inverse function approximate expression are derived at nine points on the inner and outer circumferences on the disk medium 10. An average of the coefficients is set in the memory 23 as a coefficient of the inverse function approximate expression of the off-track position calculating unit 200.

Even though the same coefficient is determined by averaging on the inner and outer circumferences on the disk medium 10, detection inclination changes in off-track positioning are rarely observed on the intermediate/inner circumference. However, on the outer circumference on the disk medium 10, as shown in FIG. 14, a change in loop transfer gain appears.

In the embodiment, it is supposed that the same coefficient is employed over the entire circumference of the disk medium 10. The present invention is not limited to the configuration. That is, coefficients may be switched depending on radial positions on the disk medium 10, or respective coefficients may be expressed as functions of radial positions and serialized.

In this case, in a conventional off-track position detecting system, it is assumed that burst detection characteristics have a symmetrical shape. For this reason, in a drive which exhibits, for example, the burst detection characteristics as shown in FIG. 8, servo performance cannot be easily assured, so that a yield decreases. In this case, as a factor of an asymmetrical system, the degree of deviation of a burst pattern in servo track write (recording of servo information), a setting angle error of a head, and the like are known. When the position detecting scheme according to the embodiment is applied, preferable servo performance can be assured for the disk drive having such an asymmetrical system.

Even though burst detection characteristics has a small asymmetrical diversity, in a conventional scheme, only a coefficient gain to a burst difference signal is corrected. For this reason, a variation in servo gain occurs in off-track positioning. When the degree of variation is large, off-track positioning accuracy is deteriorated. With a recent decrease in track pitch, deterioration in off-track positioning accuracy is posed as a problem. In contrast to this, in the scheme according to the embodiment, since a change in servo characteristics depending on off-track positions can be suppressed, the scheme is effective as a countermeasure against a variation in servo gain in off-track positioning.

In the disk drive, a seek operation which moves the head 12 to a position near a target track is performed. The position detecting scheme according to the embodiment also contributes to improvement of the seek operation performance. In general, in the final stage of the seek operation, a change in moving speed of the head 12 must be smooth. However, when a detection inclination of the detection system varies, even though an actual variation in speed is small, an apparent variation in detection speed is large. This causes deterioration of track stability when the head is positioned at the target track position. When the position detecting scheme according to the embodiment is applied, it can be realized not only that servo characteristics is kept constant but also that an apparent variation in detection speed is suppressed. For this reason, the track stability can be improved. Therefore, as a result, seek operation time can be shortened.

(First Modification)

As a off-track position detecting method according to the embodiment, a method using a burst value which is an amplitude value obtained from a servo burst pattern for detecting a positional error (deviation) is applied. In contrast to this, in a scheme according to the modification, a servo burst pattern is an inclined pattern for detecting a phase difference, pieces of position information of two types, i.e., a sine component value and a cosine component value are used in place of amplitude information obtained by the signal processing unit 16.

In the scheme according to the modification, the configuration of the tangent calculating unit 220 in the off-track position calculating unit 200 can be simplified. In this case, processing is performed on the assumption that values corresponding to servo calculation results BstAB and BstCD obtained by using four values, i.e., burst values BstA to BstD are determined. The other processing is the same as that in the embodiment.

A difference between the detecting method according to the modification and a conventional phase difference detecting method will be briefly described below.

In the conventional phase difference detecting method, a process of converting ±90 degrees (both the ends of the abscissa in FIG. 10) into phase-equivalent values by an arctangent transform (atan) process is performed. In contrast to this, in the method according to the modification, phase events are exactly divided by 45 degrees, and a process using the inverse function approximate expression is executed without using the arctangent transform (atan) process itself to detect a position. In the method according to the modification, even though ideal characteristics constituted by a sine component value and a cosine component value include distortion with respect to an off-track position, an accurate position can be detected, and servo performance can be improved.

(Second Modification)

This modification is obtained by applying the off-track position detecting scheme according to the embodiment to a fine position detecting scheme in an incremental encoder using a pseudo sine wave output scheme.

For example, in a carriage operation of an optical disk drive, speed detection using a DC motor in which a hall element is arranged is applied. In this case, in a low-speed operation called trace, speed feedback control is not performed, so that lens offset (DC offset of a lens fine focus system) is caused disadvantageously.

As a scheme which improves this drawback, a scheme which detects a position of a hall element in a resolution section at a low speed to control the position of a lens to a target track position. However, an intermediate position must be detected by detecting a phase difference between an A-phase signal and a B-phase signal. For this reason, realization of the arctangent processing and a distortion caused by sine waves of the A- and B-phase signals are posed as problems. In the scheme according to the modification, once a calibration process is performed, an arctangent-equivalent value can be calculated by a cubic function to make it possible to cope with distortion from the sine waves of the A- and B-phase signals.

According to the embodiment, there can be provided a disk drive having a servo control function which applies a phase difference detecting scheme using a servo burst pattern to make it possible to detect a genuine off-track position at a high accuracy.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a head configured to read data recorded on a disk medium;
   an actuator configured to move the head in a radial direction on the disk medium; and
   a servo processor which uses servo information recorded on the disk medium to drive and control the actuator and performs positioning control of the head to a target track position on the disk medium,
   wherein the servo processor
   acquires burst values as amplitude values from servo burst patterns included in the servo information on the basis of a reproduced signal output from the head, and includes:
   a tangent calculating unit configured to calculate a tangent-equivalent value from the burst values;
   a memory configured to store information representing an inverse function approximate expression structured on the basis of characteristics of the tangent-equivalent value converted on the basis of the burst values and the off-track position of the head;
   a phase calculating unit which uses an inverse function approximate expression stored in the memory to calculate a phase-equivalent value from the tangent-equivalent value calculated by the tangent calculating unit; and
   a position calculating unit which uses the phase-equivalent value calculated by the phase calculating unit to calculate the off-track position with respect to the target track position.

2. The disk drive according to claim 1, further comprising:
   a signal processing unit which extracts first to four burst values from the servo burst patterns included in the servo information on the basis of the reproduced signal output from the head, wherein
   the servo processor acquires the first to four burst values from the signal processing unit.

3. The disk drive according to claim 1, wherein the memory stores the inverse function approximate expression and information representing a coefficient set on the basis of off-track position characteristics measured for respective phase event values obtained by dividing the same address section at a track address to identify the target track position, and
   the phase calculating unit uses the inverse function approximate expression and the coefficient stored in the memory to calculate the phase-equivalent value.

4. The disk drive according to claim 1, wherein
   as the inverse function approximate expression of the tangent-equivalent value, positive and negative approximate expressions of two types are included.

5. The disk drive according to claim 1, wherein
   as the inverse function approximate expression, a cubic function expression is included.

6. A method of servo control for a disk drive having a head which reads data recorded on a disk medium and an actuator which moves the head in a radial direction on the disk medium, using servo information recorded on the disk medium to drive and control the actuator and performing positioning control of the head to a target track position on the disk medium, the method comprising:
   acquiring burst values as amplitude values from servo burst patterns included in the servo information on the basis of a reproduced signal output from the head,
   calculating a tangent-equivalent value from the burst values,
   calculating a phase-equivalent value from the tangent-equivalent value using an inverse function approximate expression structured on the basis of characteristics of the tangent-equivalent value converted on the basis of the burst values and the off-track position of the head, and
   using the phase-equivalent value to calculate the off-track position with respect to the target track position.

7. The method according to claim 6, wherein
   the phase-equivalent value is calculated by using the inverse function approximate expression and a coefficient set on the basis of off-track position characteristics measured for respective phase event values obtained by dividing the same address section at a track address to identify the target track position.

* * * * *